UNITED STATES PATENT OFFICE.

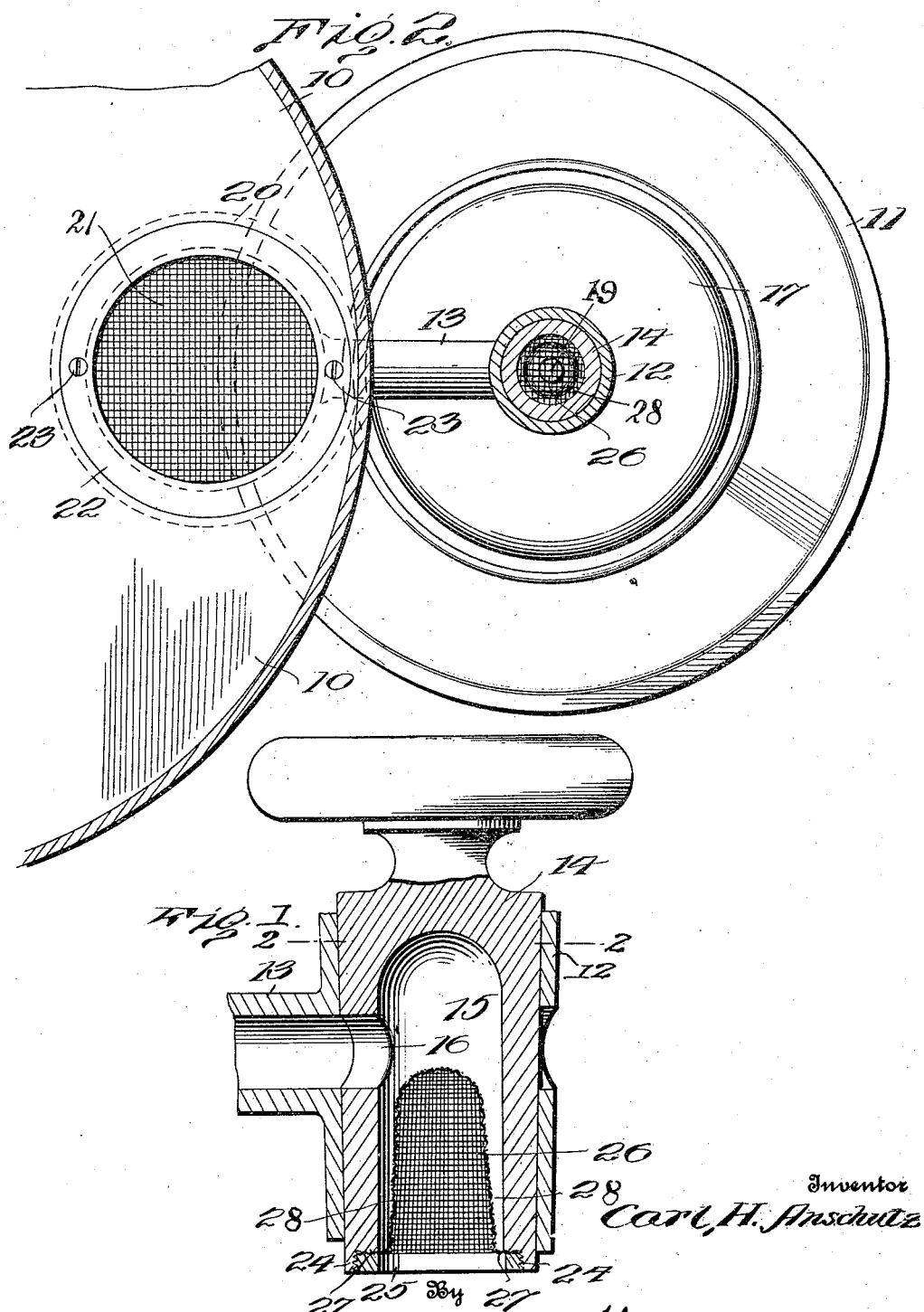

CARL H. ANSCHUTZ, OF WILSON, KANSAS.

STRAINER FOR CREAM-SEPARATORS.

1,179,387.  Specification of Letters Patent.  Patented Apr. 18, 1916.

Application filed April 30, 1915. Serial No. 24,973.

*To all whom it may concern:*

Be it known that I, CARL H. ANSCHUTZ, a citizen of the United States, residing at Wilson, in the county of Ellsworth and State of Kansas, have invented certain new and useful Improvements in Strainers for Cream-Separators, of which the following is a specification.

This invention relates to improvements in straining devices, more particularly to strainers applied to cream separators and has for one of its objects to provide a simply constructed attachment whereby all foreign matter contained in the cream is retained in position to be readily removed and prevented from being carried into the cream receptacle.

Another object of the invention is to provide a device of this character which may be applied without material structural change to cream separators of various forms and makes.

With these and other objects in view, the invention consists in certain novel features of construction as hereinafter shown and described, and then specifically pointed out in the claim; and in the drawings illustrative of the preferred embodiment of the invention, Figure 1 is a vertical sectional view of the improved device; Fig. 2 is a plan view of a portion of a cream separator on a reduced scale with a part in section on the line 2—2 of Fig. 1.

Corresponding and like parts are referred to in the following description and indicated in all the views of the accompanying drawings by the same reference characters.

A cream separator of the ordinary construction comprises a supply tank for the unseparated milk and cream, a separating mechanism, generally operating centrifugally, and a controlling valve or faucet between the supply tank and the separating mechanism, and in the drawings, a portion of the supply tank is indicated at 10, a portion of the separating mechanism at 11, and the controlling valve or faucet at 12. Extending between the faucet 12 and the tank 10 is a supply pipe 13.

In the ordinary cream separator, the faucet 12 includes a tapered plug 14 having a relatively large interior cavity or chamber 15, closed at the top and opening downwardly into the receiving portion of the separator. The plug 14 is provided with the usual lateral port 16 providing communication between the conductor 13 and the chamber 15 of the faucet plug. A float forms a part of the separating mechanism and is indicated conventionally at 17.

The conduit 13 is enlarged where it enters the tank 10, and in the improved device the tank is provided with an annular shoulder 20 surrounding the intake end of the conduit. Bearing upon the shoulder 20 is a circular member of screen material 21 and held in place upon the shoulder by an annular bearing member 22, the latter being secured in any suitable manner, as, for instance, by screws 23. By this means, the milk and cream is strained before it passes into the conduit 13 and thence to the separator. By employing the screws 23 and the retaining member 22, the screen 21 may be readily removed for cleansing or renewal.

At its lower end, the plug 14 is formed with an annular shoulder, indicated at 24, which is threaded to receive an annular holding member 25. Disposed within the chamber 15 of the plug 14 is a screen member, indicated as a whole at 26, and arching upwardly for a relatively long distance within the chamber and formed with a lateral annular flange 27 at its lower end to bear against the shoulder 24 and retain in position by the bearing member 25. The diameter of the arching portion 26 of the screen is less than the interior diameter of the chamber 15, as shown clearly in Fig. 1, whereby an anular space 28 is provided at the lower end of the chamber 15. It will be noted that the intake 16 is located intermediate the chamber 15 and causes the liquid to flow into the chamber at right angles to its longitudinal axis, and that the major portion of the upwardly arching portion 26 of the screen is located below the line of the intake. Thus, as the milk flows from the tank 10, it naturally circulates or whirls rapidly around within the chamber 15 and is retarded to a limited extent in its downward and circuitous flow by the arched form of the screen 26 so that the hairs and other particles of foreign matter which may be separated from the milk and cream will be caused to settle upon the flat pervious bottom 27 of the portion 28 of the chamber 15 and thus prevented from passing to the separator. By this simple arrangement, the milk and cream is strained twice while passing from the tank to the separator, and at the second straining provision is made for dispensing of the settlings of foreign matter. The bottom 27 of the chamber 15 being of screen material does not prevent the constant continuous downward flow of the milk or other liquid, while at the same time retaining the particles of foreign matter and preventing them from being carried against and settling upon the substantially vertical walls of the arching portion 26 of the screen. This is an important feature of the improved device and materially increases its utility.

Having thus described the invention, what is claimed as new is:—

In a device of the class described, a hollow body closed at the top and opening downwardly and with an inlet located intermediate the body and arranged to direct the flow at right angles to the longitudinal axis thereof, a device of screen material disposed in said body and including an upwardly arching portion of less diameter than the interior of the body and an annular horizontal portion extending to the walls of the body, the major part of the arching portion being located below the intake, whereby a settling chamber is produced between the arching portion of the walls of the body with its inner wall and flat bottom foraminous and the liquid caused to rapidly circulate around the arching portion and over the flat bottom and to flow constantly downward through all parts of the same.

In testimony whereof I affix my signature in presence of two witnesses.

CARL H. ANSCHUTZ. [L. S.]

Witnesses:
    DOROTHY T. ANSCHUTZ,
    DAVID W. SOCOLOFSKY.